United States Patent
Choi et al.

(10) Patent No.: US 12,284,137 B2
(45) Date of Patent: Apr. 22, 2025

(54) METHOD AND APPARATUS FOR RECONFIGURING BANDWIDTH PART FOR GROUPCAST IN SIDELINK COMMUNICATION

(71) Applicants: Hyundai Motor Company, Seoul (KR); Kia Corporation, Seoul (KR)

(72) Inventors: Su Han Choi, Gyeonggi-do (KR); Gene Back Hahn, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/514,097

(22) Filed: Nov. 20, 2023

(65) Prior Publication Data

US 2024/0089067 A1    Mar. 14, 2024

Related U.S. Application Data

(63) Continuation of application No. 17/667,028, filed on Feb. 8, 2022, now Pat. No. 11,855,929, which is a
(Continued)

(30) Foreign Application Priority Data

Mar. 18, 2020   (KR) ...................... 10-2020-0033449

(51) Int. Cl.
*H04W 8/24*     (2009.01)
*H04L 5/00*     (2006.01)
(Continued)

(52) U.S. Cl.
CPC ............ *H04L 5/0092* (2013.01); *H04W 4/06* (2013.01); *H04W 8/24* (2013.01); *H04W 92/18* (2013.01)

(58) Field of Classification Search
CPC ..... H04W 8/24; H04W 72/0453; H04W 4/06; H04W 92/18; H04W 72/20; H04L 5/0092
See application file for complete search history.

(56) References Cited

U.S. PATENT DOCUMENTS 10,750,337 B1 *  8/2020 Alasti ................. H04L 5/001
2019/0239112 A1   8/2019 Rao et al.
(Continued)

FOREIGN PATENT DOCUMENTS

CN          111818648 A       10/2020

OTHER PUBLICATIONS

3GPP, "Analysis and Design of V2X Resource Entities", Fraunhofer HHI, Fraunhofer HS, R1-1900354, 3GPP TSG RAN WG1 Meeting AH1901, Jan. 21-25, 2019, 10 pages.
(Continued)

*Primary Examiner* — Congvan Tran
(74) *Attorney, Agent, or Firm* — Fox Rothschild LLP

(57) ABSTRACT

An operation method of a first terminal in a communication system is provided. The method includes configuring sidelink (SL) bandwidth parts (BWPs) used for groupcast sidelink communication and transmitting a configuration information message including configuration information of the SL BWPs to participating terminals participating in the groupcast sidelink communication. The groupcast sidelink communication is performed with the participating terminals using one or more SL BWPs among the SL BWPs. In response to determining that reconfiguration of the SL BWPs is necessary, the SL BWPs are reconfigured and a reconfiguration information message including reconfiguration information of the SL BWPs is transmitted to the participating terminals.

16 Claims, 8 Drawing Sheets

Related U.S. Application Data continuation of application No. 16/843,451, filed on Apr. 8, 2020, now Pat. No. 11,277,250.

(60) Provisional application No. 62/832,086, filed on Apr. 10, 2019.

(51) Int. Cl.
*H04W 4/06* (2009.01)
*H04W 92/18* (2009.01)

(56) References Cited

U.S. PATENT DOCUMENTS

| | | | |
|---|---|---|---|
| 2020/0053524 A1* | 2/2020 | Novlan | H04W 84/20 |
| 2020/0235887 A1 | 7/2020 | Hou et al. | |
| 2021/0051630 A1* | 2/2021 | Chae | H04W 72/02 |
| 2021/0160876 A1* | 5/2021 | Osawa | H04L 5/0091 |
| 2021/0235492 A1 | 7/2021 | Iyer et al. | |
| 2021/0243773 A1* | 8/2021 | Osawa | H04L 5/0053 |
| 2021/0321348 A1* | 10/2021 | Ohara | H04W 72/30 |
| 2021/0352623 A1* | 11/2021 | Wang | H04W 76/14 |
| 2021/0377806 A1* | 12/2021 | Osawa | H04W 28/18 |
| 2022/0060286 A1 | 2/2022 | Yoshioka et al. | |
| 2022/0078805 A1 | 3/2022 | Yoshioka et al. | |

OTHER PUBLICATIONS

3GPP, "Evaluation of NR V2X Mode 2 Resource Allocation", Fraunhofer HHI, Fraunhofer IIS, 3GPP TSG RAN WG1 96, R1-1901844, Feb. 25-Mar. 1, 2019, 10 pages.

3GPP, "Overall Consideration on NR V2X Resource Allocation", ZTE, Sanechips, 3GPP TSG-RAN WG2 104, R.2-1816981, Nov. 12-16, 2018, 6 pages.

R1-1904329, "Resource Allocation for Mode 1 NR V2X", Fraunhofer HHI, Fraunhofer IIS, Agenda item: 7.2.4.2.1, 3GPP TSF RAN WG1 #96bis, Xi'an, China, (Apr. 8-12, 2019) 5 pages.

* cited by examiner

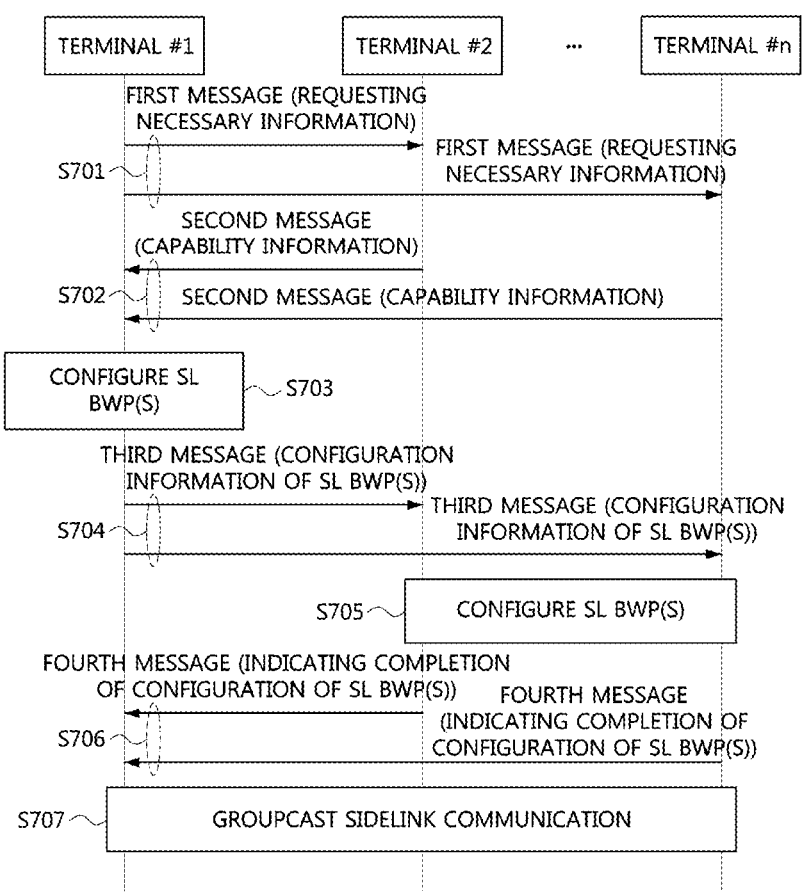

METHOD AND APPARATUS FOR RECONFIGURING BANDWIDTH PART FOR GROUPCAST IN SIDELINK COMMUNICATION

This application is a Continuation of U.S. application Ser. No. 17/667,028, filed on Feb. 8, 2022, which is a Continuation of U.S. application Ser. No. 16/843,451, filed on Apr. 8, 2020, which claims the benefit of priority to U.S. Provisional Patent Application No. 62/832,086 filed on Apr. 10, 2019 and Korean Patent Application No. 10-2020-0033449 filed on Mar. 18, 2020, the entire contents of which are incorporated herein by reference.

BACKGROUND

1. Technical Field

The present disclosure relates generally to sidelink communication techniques, and more specifically, to techniques of reconfiguring a bandwidth part (BWP) for groupcast in sidelink communication.

2. Related Art

A fifth-generation (5G) communication system (e.g., New Radio (NR) communication system) which uses a frequency band higher than a frequency band of a fourth-generation (4G) communication system (e.g., Long Term Evolution (LTE) communication system or LTE-Advanced (LTE-A) communication system) as well as the frequency band of the 4G communication system has been considered for processing of wireless data. The 5G communication system is capable of supporting Enhanced Mobile Broadband (eMBB) communications, Ultra-Reliable and Low-Latency communications (URLLC), massive Machine Type Communications (mMTC), and the like.

The 4G communication system and 5G communication system are capable of supporting Vehicle-to-Everything (V2X) communications. The V2X communications supported in a cellular communication system, such as the 4G communication system, the 5G communication system, and the like, may be referred to as "Cellular-V2X (C-V2X) communications." The V2X communications (e.g., C-V2X communications) may include Vehicle-to-Vehicle (V2V) communications, Vehicle-to-Infrastructure (V2I) communications, Vehicle-to-Pedestrian (V2P) communication, Vehicle-to-Network (V2N) communication, and the like.

In the cellular communication system, the V2X communications (e.g., C-V2X communications) may be performed based on "sidelink" communication technologies (e.g., Proximity-based Services (ProSe) communication technology, Device-to-Device (D2D) communication technology, or the like). For example, sidelink channels for vehicles participating in V2V communications may be established, and communications between the vehicles may be performed using the sidelink channels.

Meanwhile, one or more bandwidth parts (BWPs) may be configured within a system bandwidth in the NR communication system, and communications between a base station and a terminal may be performed within a BWP (e.g., an active BWP). The BWP may be classified into a downlink (DL) BWP for DL communications and an uplink (UL) BWP for UL communications. The maximum number of DL MVPs and UL BWPs configurable within the system bandwidth may be four, respectively. One BWP may include consecutive resource block(s) (RB(s)) in the frequency domain, and one subcarrier spacing may be used in one BWP. Only one BWP (e.g., DL BWP, UL BWP) may be activated in a specific time period. However, BWPs are not used in the sidelink communication, and methods for reconfiguring the BWP for sidelink communication are required.

SUMMARY

Accordingly, the present disclosure provides a method and an apparatus for reconfiguring a BWP for groupcast in sidelink communication. In accordance with exemplary embodiments of the present disclosure, an operation method of a first terminal in a communication system may include configuring sidelink (SL) bandwidth parts (BWPs) used for groupcast sidelink communication; transmitting a configuration information message including configuration information of the SL BWPs to participating terminals participating in the groupcast sidelink communication; performing the groupcast sidelink communication with the participating terminals using one or more SL BWPs among the SL BWPs; in response to determining that reconfiguration of the SL BWPs is necessary, reconfiguring the SL BWPs; and transmitting a reconfiguration information message including reconfiguration information of the SL BWPs to the participating terminals.

The SL BWPs may be configured within a frequency range or candidate SL BWPs configured by a base station. The SL BWPs may be configured based on one or more among capability information, transmission data characteristics, and channel states of the participating terminals. Each of the configuration information message and the reconfiguration information message may be transmitted and received via a default SL BWP preconfigured between the first terminal and the participating terminals. Each of the configuration information and the reconfiguration information may include an SL BWP list and information indicating an initial SL BWP.

The SL BWP list may include one or more of a bandwidth, a subcarrier spacing, a starting resource block (RB) index, an ending RB index, an RB offset, a number of RBs, an activation time point, an activation duration, and a service type of the one or more SL BWPs. When there is no SL BWP satisfying requirement of each of the first terminal and the participating terminals in the SL BWP list, or terminals participating in the groupcast sidelink communication are changed, the reconfiguration of the SL BWPs may be determined to be necessary.

The performing of the groupcast sidelink communication may include performing the groupcast sidelink communication with the participating terminals using a first SL BWP activated among the SL BWPs indicated by the configuration information; in response to determining that switching of the active SL BWP or addition of a new SL BWP is required, selecting a second SL BWP among the SL BWPs; transmitting sidelink control information (SCI) including information indicating the second SL BWP to the participating terminals; and performing the groupcast sidelink communication with the participating terminals using the second SL BWP or using both the first SL BWP and the second SL BWP.

Furthermore, in accordance with exemplary embodiments of the present disclosure, an operation method of a participating terminal participating in groupcast sidelink communication may include transmitting an information response message including capability information of the participating terminal to a first terminal; receiving, from the first terminal, a configuration information message including configuration information of sidelink (SL) bandwidth parts (BWPs) determined in consideration of the capability information; performing the groupcast sidelink communication with the first terminal using one or more SL BWPs among the SL BWPs; and in response to determining that reconfiguration of the SL BWPs is necessary, transmitting a reconfiguration request message requesting the reconfiguration of the SL BWPs to the first terminal.

The SL BWPs may be configured within a frequency range or candidate SL BWPs configured by a base station. Each of the information response message, the configuration information message, and the reconfiguration request message may be transmitted and received via a default SL BWP configured between the first terminal and the participating terminals. The configuration information may include an SL BWP list and information indicating an initial SL BWP.

The SL BWP list may include one or more among a bandwidth, a subcarrier spacing, a starting resource block (RB) index, an ending RB index, an RB offset, a number of RBs, an activation time point, an activation duration, and a service type of the one or more SL BWPs. When there is no SL BWP satisfying requirement of the participating terminal in the SL BWP list, the reconfiguration request message may be transmitted to the first terminal.

The performing of the groupcast sidelink communication may further include performing the groupcast sidelink communication with the first terminal using a first SL BWP activated among the SL BWPs indicated by the configuration information; receiving, from the first terminal, sidelink control information (SCI) including information indicating a second SL BWP among the SL BWPs; and performing the groupcast sidelink communication with the first terminal using the second SL BWP or using both the first SL BWP and the second SL BWP.

Furthermore, in accordance with exemplary embodiments of the present disclosure, a first terminal in a communication system may include a processor and a memory configured to store at least one instruction executable by the processor. The at least one instruction causes the processor to: receive an information response message including capability information from participating terminals participating in groupcast sidelink communication; configure sidelink (SL) bandwidth parts (BWPs) used for the groupcast sidelink communication based on the capability information; transmit a configuration information message including configuration information of the SL BWPs to the participating terminals; perform the groupcast sidelink communication with the participating terminals using one or more SL BWPs among the SL BWPs; in response to determining that reconfiguration of the SL BWPs is necessary, reconfigure the SL BWPs; and transmit a reconfiguration information message including reconfiguration information of the SL BWPs to the participating terminals.

Each of the information response message, the configuration information message, and the reconfiguration information message may be transmitted and received via a default SL BWP preconfigured between the first terminal and the participating terminals. Additionally, each of the configuration information and the reconfiguration information may include an SL BWP list and information indicating an initial SL BWP. When there is no SL BWP satisfying requirement of each of the first terminal and the participating terminals in the SL BWP list, or terminals participating in the groupcast sidelink communication are changed, the reconfiguration of the SL BWPs may be determined to be necessary.

In the performing of the groupcast sidelink communication, the at least one instruction may further cause the processor to: perform the groupcast sidelink communication with the participating terminals using a first SL BWP activated among the SL BWPs indicated by the configuration information; in response to determining that switching of the active SL BWP or addition of a new SL BWP is required, select a second SL BWP among the SL BWPs; transmit sidelink control information (SCI) including information indicating the second SL BWP to the participating terminals; and perform the groupcast sidelink communication with the participating terminals using the second SL BWP or using both the first SL BWP and the second SL BWP.

According to the exemplary embodiments of the present disclosure, an SL BWP for SL communication between terminals may be configured. The terminals may be configured to perform SL communication within the SL BWP. The SL communication may be performed in a unicast scheme within the SL BWP. In particular, interferences caused by the SL communication may be reduced. In addition, a time required for performing a beam measurement operation, a beam update operation, a beam recovery operation, and the like may be reduced. In addition, sidelink communication may be performed in a groupcast manner.

The terminal may be configured to configure SL BWPs for groupcast sidelink communication, and transmit configuration information of the SL BWPs to participating terminals. In particular, the groupcast sidelink communication may be performed using the SL BWP(s) configured by the terminal. In addition, when reconfiguration of the SL BWPs is required, the terminal may be configured to reconfigure the SL BWPs and transmit reconfiguration information of the SL BWPs to the participating terminals. Accordingly, resources may be efficiently used in sidelink communication, and the performance of the communication system may be improved.

BRIEF DESCRIPTION OF DRAWINGS

The present disclosure will become more apparent by describing in detail embodiments of the present disclosure with reference to the accompanying drawings, in which:

FIG. 7A is a sequence chart illustrating a first exemplary embodiment of a method of reconfiguring a BWP for groupcast in sidelink communication;

Figure 1:
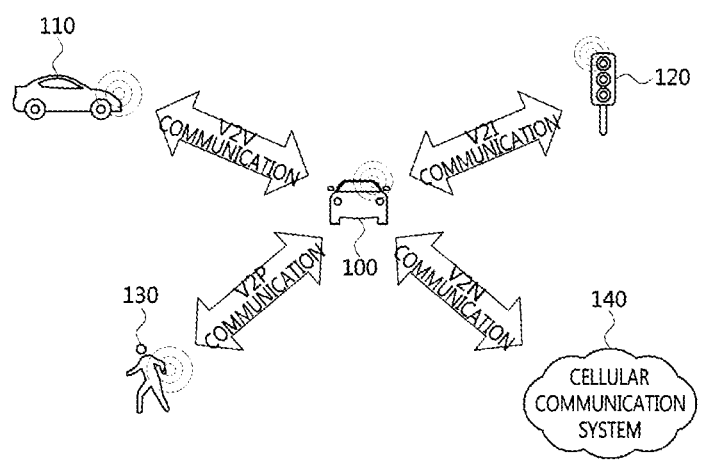
FIG. 1 is a conceptual diagram illustrating V2X communication scenarios according to an exemplary embodiment of the present disclosure.

It should be understood that the above-referenced drawings are not necessarily to scale, presenting a somewhat simplified representation of various features illustrative of the basic principles of the disclosure. The specific design features of the present disclosure, including, for example, specific dimensions, orientations, locations, and shapes, will be determined in part by the particular intended application and use environment.

DETAILED DESCRIPTION

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" or controller may refer to a hardware device that includes a memory and a processor. The memory is configured to store program instructions, and the processor is specifically programmed to execute the program instructions to perform one or more processes which are described further below. The control unit may control operation of units, modules, parts, or the like, as described herein. Moreover, it is understood that the below methods may be executed by an apparatus (e.g., communication node) comprising the control unit in conjunction with one or more other components, as would be appreciated by a person of ordinary skill in the art.

Furthermore, the control unit of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a conceptual diagram illustrating V2X communication scenarios. As shown in FIG. 1, the V2X communications may include Vehicle-to-Vehicle (V2V) communications, Vehicle-to-Infrastructure (V2I) communications, Vehicle-to-Pedestrian (V2P) communications, Vehicle-to-Network (V2N) communications, and the like. The V2X communications may be supported by a cellular communication system (e.g., a cellular communication system 140), and the V2X communications supported by the cellular communication system 140 may be referred to as "Cellular-V2X (C-V2X) communications." In particular, the cellular communication system 140 may include the 4G communication system (e.g., LTE communication system or LTE-A communication system), the 5G communication system (e.g., NR communication system), and the like.

The V2V communications may include communications between a first vehicle 100 (e.g., a communication node disposed within the vehicle 100) and a second vehicle 110 (e.g., a communication node disposed within the vehicle 110). Various driving information such as velocity, heading, time, position, and the like may be exchanged between the vehicles 100 and 110 via the V2V communications. For example, autonomous driving (e.g., platooning) may be supported based on the driving information exchanged via the V2V communications. The V2V communications supported in the cellular communication system 140 may be performed based on "sidelink" communication technologies (e.g., ProSe and D2D communication technologies, and the like). In particular, the communications between the vehicles 100 and 110 may be performed using at least one sidelink channel established between the vehicles 100 and 110.

The V2I communications may include communications between the first vehicle 100 (e.g., the communication node disposed within the vehicle 100) and an infrastructure (e.g., road side unit (RSU)) 120 disposed along a road. The infrastructure 120 may also include a traffic light or a street light disposed along the road. For example, when the V2I communications are performed, the communications may be performed between the communication node disposed within the first vehicle 100 and a communication node disposed within a traffic light. Traffic information, driving information, and the like may be exchanged between the first vehicle 100 and the infrastructure 120 via the V2I communications. The V2I communications supported in the cellular communication system 140 may also be performed based on sidelink communication technologies (e.g., ProSe and D2D communication technologies, and the like). In particular, the communications between the vehicle 100 and the infrastructure 120 may be performed using at least one sidelink channel established between the vehicle 100 and the infrastructure 120.

The V2P communications may include communications between the first vehicle 100 (e.g., the communication node disposed within the vehicle 100) and a person 130 (e.g., a communication node carried by the person 130). The driving information of the first vehicle 100 and movement information of the person 130 such as velocity, heading, time, position, and the like may be exchanged between the vehicle 100 and the person 130 via the V2P communications. The communication node disposed within the vehicle 100 or the communication node carried by the person 130 may be configured to generate an alarm that provides an indication regarding a danger by detecting a dangerous situation based on the obtained driving information and movement information.

The V2P communications supported in the cellular communication system 140 may be performed based on sidelink communication technologies (e.g., ProSe and D2D communication technologies, and the like). In particular, the communications between the communication node disposed within the vehicle 100 and the communication node carried by the person 130 may be performed using at least one sidelink channel established between the communication nodes.

The V2N communications may include communications between the first vehicle 100 (e.g., the communication node disposed within the vehicle 100) and a server connected via the cellular communication system 140. The V2N communications may be performed based on the 4G communication technology (e.g., LTE or LTE-A) or the 5G communication technology (e.g., NR). Additionally, the V2N communications may be performed based on a Wireless Access in Vehicular Environments (WAVE) communication technology or a Wireless Local Area Network (WLAN) communication technology which is defined in Institute of Electrical and Electronics Engineers (IEEE) 802.11, or a Wireless Personal Area Network (WPAN) communication technology defined in IEEE 802.15.

Figure 2:
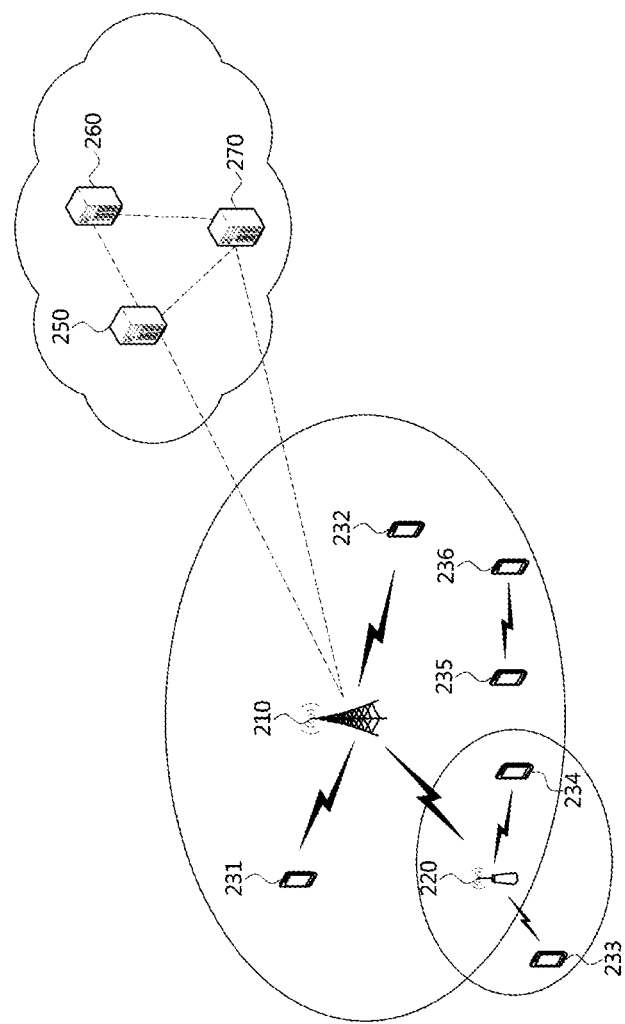
FIG. 2 is a conceptual diagram illustrating exemplary embodiments of a cellular communication system.

Meanwhile, the cellular communication system 140 supporting the V2X communications may be configured as follows. FIG. 2 is a conceptual diagram illustrating exemplary embodiments of a cellular communication system.

As shown in FIG. 2, a cellular communication system may include an access network, a core network, and the like. The access network may include a base station 210, a relay 220, user equipment (UEs) 231 through 236, and the like. The UEs 231 through 236 may include communication nodes disposed within the vehicles 100 and 110 of FIG. 1, the communication node disposed within the infrastructure 120 of FIG. 1, the communication node carried by the person 130 of FIG. 1, and the like. When the cellular communication system supports the 4G communication technology, the core network may include a serving gateway (S-GW) 250, a packet data network (PDN) gateway (P-GW) 260, a mobility management entity (MME) 270, and the like.

When the cellular communication system supports the 5G communication technology, the core network may include a user plane function (UPF) 250, a session management function (SMF) 260, an access and mobility management function (AMF) 270, and the like. Alternatively, when the cellular communication system operates in a Non-Stand Alone (NSA) mode, the core network constituted by the S-GW 250, the P-GW 260, and the MME 270 may support the 5G communication technology as well as the 4G communication technology, or the core network constituted by the UPF 250, the SMF 260, and the AMF 270 may support the 4G communication technology as well as the 5G communication technology.

When the cellular communication system supports a network slicing technique, the core network may be divided into a plurality of logical network slices. For example, a network slice supporting V2X communications (e.g., a V2V network slice, a V2I network slice, a V2P network slice, a V2N network slice, etc.) may be configured, and the V2X communications may be supported via the V2X network slice configured in the core network.

The communication nodes (e.g., base station, relay, UE, S-GW, P-GW, MME, UPF, SMF, AMF, etc.) including the cellular communication system may be configured to perform communications using at least one communication technology among a code division multiple access (CDMA) technology, a time division multiple access (TDMA) technology, a frequency division multiple access (FDMA) technology, an orthogonal frequency division multiplexing (OFDM) technology, a filtered OFDM technology, an orthogonal frequency division multiple access (OFDMA) technology, a single carrier FDMA (SC-FDMA) technology, a non-orthogonal multiple access (NOMA) technology, a generalized frequency division multiplexing (GFDM) technology, a filter bank multi-carrier (FBMC) technology, a universal filtered multi-carrier (UFMC) technology, and a space division multiple access (SDMA) technology. The communication nodes (e.g., base station, relay, UE, S-GW, P-GW, MME, UPF, SMF, AMF, etc.) including the cellular communication system may be configured as follows.

Figure 3:
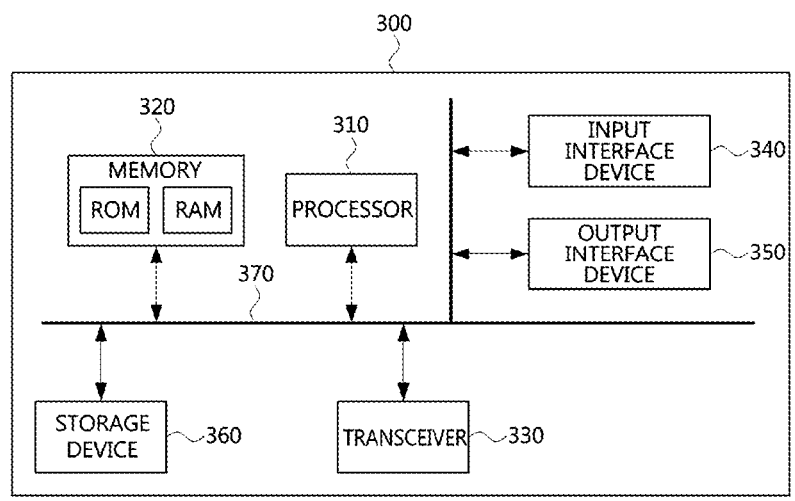
FIG. 3 is a conceptual diagram illustrating exemplary embodiments of a communication node constituting a cellular communication system.

FIG. 3 is a conceptual diagram illustrating exemplary embodiments of a communication node constituting a cellular communication system. As shown in FIG. 3, a communication node 300 may include at least one processor 310, a memory 320, and a transceiver 330 connected to a network for performing communications. Additionally, the communication node 300 may further include an input interface device 340, an output interface device 350, a storage device 360, and the like. Each component included in the communication node 300 may be configured to communicate with each other as connected via a bus 370.

However, each of the components included in the communication node 300 may be connected to the processor 310 via a separate interface or a separate bus rather than the common bus 370. For example, the processor 310 may be connected to at least one of the memory 320, the transceiver 330, the input interface device 340, the output interface device 350, and the storage device 360 via a dedicated interface.

The processor 310 may be configured to execute at least one instruction stored in at least one of the memory 320 and the storage device 360. The processor 310 may refer to a central processing unit (CPU), a graphics processing unit (GPU), or a dedicated processor on which methods in accordance with exemplary embodiments of the present disclosure may be performed. Each of the memory 320 and the storage device 360 may include at least one of a volatile storage medium and a non-volatile storage medium. For example, the memory 320 may include at least one of read-only memory (ROM) and random access memory (RAM).

Referring again to FIG. 2, in the communication system, the base station 210 may form a macro cell or a small cell, and may be connected to the core network via an ideal backhaul or a non-ideal backhaul. The base station 210 may be configured to transmit signals received from the core network to the UEs 231 through 236 and the relay 220, and transmit signals received from the UEs 231 through 236 and the relay 220 to the core network. The UEs 231, 232, 234, 235 and 236 may be part of the cell coverage of the base station 210. The UEs 231, 232, 234, 235 and 236 may be connected to the base station 210 by performing a connection establishment procedure with the base station 210. The UEs 231, 232, 234, 235 and 236 may be configured to communicate with the base station 210 after being connected to the base station 210.

The relay 220 may be connected to the base station 210 and may be configured to relay communications between the base station 210 and the UEs 233 and 234. In other words, the relay 220 may be configured to transmit signals received from the base station 210 to the UEs 233 and 234, and transmit signals received from the UEs 233 and 234 to the base station 210. The UE 234 may be part of the cell coverage of the base station 210 and the cell coverage of the relay 220, and the UE 233 may be part of the cell coverage of the relay 220. In other words, the UE 233 may be disposed outside or beyond the cell coverage of the base station 210.

The UEs 233 and 234 may be connected to the relay 220 by performing a connection establishment procedure with the relay 220. The UEs 233 and 234 may be configured to communicate with the relay 220 after being connected to the relay 220.

The base station 210 and the relay 220 may support multiple-input, multiple-output (MIMO) technologies (e.g., single user (SU)-MIMO, multi-user (MU)-MIMO, massive MIMO, etc.), coordinated multipoint (CoMP) communication technologies, carrier aggregation (CA) communication technologies, unlicensed band communication technologies (e.g., Licensed Assisted Access (LAA), enhanced LAA (eLAA), etc.), sidelink communication technologies (e.g., ProSe communication technology, D2D communication technology), or the like. The UEs 231, 232, 235 and 236 may be configured to perform operations corresponding to the base station 210 and operations supported by the base station 210. The UEs 233 and 234 may be configured to perform operations corresponding to the relays 220 and operations supported by the relays 220.

Particularly, the base station 210 may be referred to as a Node B (NB), an evolved Node B (eNB), a base transceiver station (BTS), a radio remote head (RRH), a transmission reception point (TRP), a radio unit (RU), a roadside unit (RSU), a radio transceiver, an access point, an access node, or the like. The relay 220 may be referred to as a small base station, a relay node, or the like. Each of the UEs 231 through 236 may be referred to as a terminal, an access terminal, a mobile terminal, a station, a subscriber station, a mobile station, a portable subscriber station a subscriber station, a node, a device, an on-broad unit (OBU), or the like.

Meanwhile, the communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node disposed within the first vehicle 100 of FIG. 1 and the UE 236 may be the communication node disposed within the second vehicle 110 of FIG. 1. When V2I communications are performed using the sidelink communication technique, the UE 235 may be the communication node disposed within first vehicle 100 of FIG. 1 and the UE 236 may be the communication node disposed within the infrastructure 120 of FIG. 1. When V2P communications are performed using the sidelink communication technique, the UE 235 may be the communication node disposed within first vehicle 100 of FIG. 1 and the UE 236 may be the communication node carried by the person 130 of FIG. 1.

The scenarios to which the sidelink communications are applied may be classified as shown below in Table 1 according to the positions of the UEs (e.g., the UEs 235 and 236) participating in the sidelink communications. For example, the scenario for the sidelink communications between the UEs 235 and 236 shown in FIG. 2 may be a sidelink communication scenario C.

TABLE 1

| Sidelink Communication Scenario | Position of UE 235 | Position of UE 236 |
| --- | --- | --- |
| A | Out of coverage of base station 210 | Out of coverage of base station 210 |
| B | In coverage of base station 210 | Out of coverage of base station 210 |
| C | In coverage of base station 210 | In coverage of base station 210 |
| D | In coverage of base station 210 | In coverage of other base station |

Figure 4:
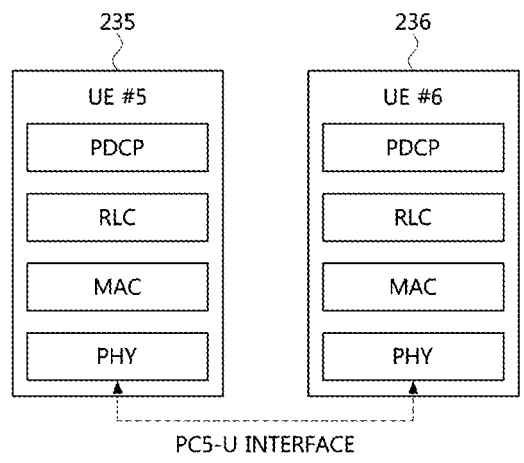
FIG. 4 is a block diagram illustrating exemplary embodiments of a user plane protocol stack of an UE performing sidelink communication.

Meanwhile, a user plane protocol stack of the UEs (e.g., the UEs 235 and 236) performing sidelink communications may be configured as follows. FIG. 4 is a block diagram illustrating exemplary embodiments of a user plane protocol stack of an UE performing sidelink communication. As shown in FIG. 4, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The user plane protocol stack of each of the UEs 235 and 236 may include a physical (PHY) layer, a medium access control (MAC) layer, a radio link control (RLC) layer, and a packet data convergence protocol (PDCP) layer.

The sidelink communications between the UEs 235 and 236 may be performed using a PC5 interface (e.g., PC5-U interface). A layer-2 identifier (ID) (e.g., a source layer-2 ID, a destination layer-2 ID) may be used for the sidelink communications and the layer 2-ID may be an ID configured for the V2X communications (e.g., V2X service). Additionally, in the sidelink communications, a hybrid automatic repeat request (HARQ) feedback operation may be supported, and an RLC acknowledged mode (RLC AM) or an RLC unacknowledged mode (RLC UM) may be supported. Meanwhile, a control plane protocol stack of the UEs (e.g., the UEs 235 and 236) performing sidelink communications may be configured as follows.

Figure 5:
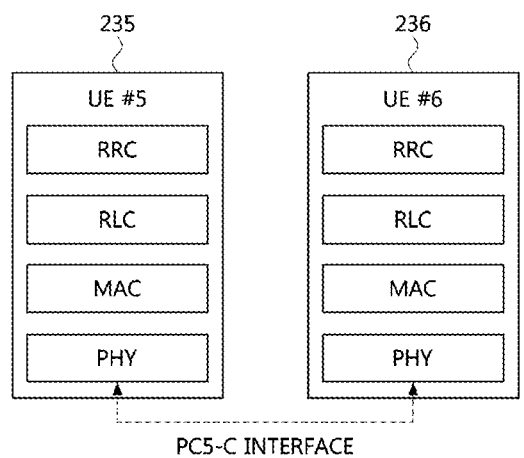
FIG. 5 is a block diagram illustrating a first exemplary embodiment of a control plane protocol stack of an UE performing sidelink communication.
Figure 6:
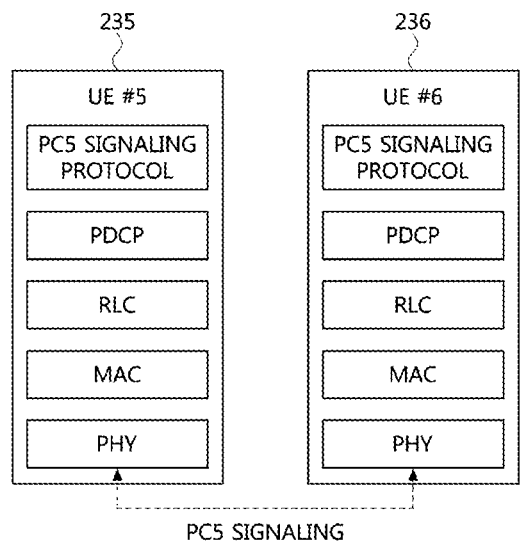
FIG. 6 is a block diagram illustrating a second exemplary embodiment of a control plane protocol stack of an UE performing sidelink communication.

FIG. 5 is a block diagram illustrating a first exemplary embodiment of a control plane protocol stack of an UE performing sidelink communication, and FIG. 6 is a block diagram illustrating a second exemplary embodiment of a control plane protocol stack of an UE performing sidelink communication. As shown in FIGS. 5 and 6, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The control plane protocol stack illustrated in FIG. 5 may be a control plane protocol stack for transmission and reception of broadcast information (e.g., Physical Sidelink Broadcast Channel (PSBCH)).

The control plane protocol stack shown in FIG. 5 may include a PHY layer, a MAC layer, all RLC layer, and a radio resource control (RRC) layer. The sidelink communications between the UEs 235 and 236 may be performed using a PC5 interface (e.g., PC5-C interface). The control plane protocol stack shown in FIG. 6 may be a control plane protocol stack for one-to-one sidelink communication. The control plane protocol stack shown in FIG. 6 may include a PHY layer, a MAC layer, an RLC layer, a PDCP layer, and a PC5 signaling protocol layer.

Meanwhile, channels used in the sidelink communications between the UEs 235 and 236 may include a Physical Sidelink Shared Channel (PSSCH), a Physical Sidelink Control Channel (PSCCH), a Physical Sidelink Discovery Channel (PSDCH), and a Physical Sidelink Broadcast Channel (PSBCH). The PSSCH may be used for transmitting and receiving sidelink data and may be configured in the UE (e.g., UE 235 or 236) by a higher layer signaling. The PSCCH may be used for transmitting and receiving sidelink control information (SCI) and may also be configured in the UE (e.g., UE 235 or 236) by a higher layer signaling.

The PSDCH may be used for a discovery procedure. For example, a discovery signal may be transmitted over the PSDCH. The PSBCH may be used for transmitting and receiving broadcast information (e.g., system information). Additionally, a demodulation reference signal (DM-RS), a synchronization signal, or the like may be used in the sidelink communications between the UEs 235 and 236. Meanwhile, a sidelink transmission mode (TM) may be classified into sidelink TMs 1 to 4 as shown below in Table 2.

TABLE 2

| Sidelink TM | Description |
|---|---|
| 1 | Transmission using resources scheduled by base station |
| 2 | UE autonomous transmission without scheduling of base station |
| 3 | Transmission using resources scheduled by base station in V2X communications |
| 4 | UE autonomous transmission without scheduling of base station in V2X communications |

When the sidelink TM 3 or 4 is supported, each of the UEs 235 and 236 may be configured to perform sidelink communications using a resource pool configured by the base station 210. The resource pool may be configured for each of the sidelink control information and the sidelink data. The resource pool for the sidelink control information may be configured based on an RRC signaling procedure (e.g., a dedicated RRC signaling procedure, a broadcast RRC signaling procedure). The resource pool used for reception of the sidelink control information may be configured by a broadcast RRC signaling procedure.

When the sidelink TM 3 is supported, the resource pool used for transmission of the sidelink control information may be configured by a dedicated RRC signaling procedure. In particular, the sidelink control information may be transmitted via resources scheduled by the base station 210 within the resource pool configured by the dedicated RRC signaling procedure. When the sidelink TM 4 is supported, the resource pool used for transmission of the sidelink control information may be configured by a dedicated RRC signaling procedure or a broadcast RRC signaling procedure. Particularly, the sidelink control information may be transmitted through resources selected autonomously by the UE (e.g., UE 235 or 236) within the resource pool configured by the dedicated RRC signaling procedure or the broadcast RRC signaling procedure.

When the sidelink TM 3 is supported, the resource pool for transmitting and receiving sidelink data may not be configured. The sidelink data may be transmitted and received via resources scheduled by the base station 210. When the sidelink TM 4 is supported, the resource pool for transmitting and receiving sidelink data may be configured by a dedicated RRC signaling procedure or a broadcast RRC signaling procedure. In particular, the sidelink data may be transmitted and received via resources selected autonomously by the UE (e.g., UE 235 or 236) within the resource pool configured by the dedicated RRC signaling procedure or the broadcast RRC signaling procedure.

Hereinafter, methods for reconfiguring a bandwidth part (BWP) in sidelink communication will be described. Even when a method (e.g., transmission or reception of a signal) to be performed at a first communication node among communication nodes is described, a corresponding second communication node may be configured to perform a method (e.g., reception or transmission of the signal) corresponding to the method performed at the first communication node. In other words, when an operation of a first vehicle is described, a corresponding second vehicle may be configured to perform an operation that corresponds to the operation of the first vehicle. Conversely, when an operation of the second vehicle is described, the corresponding first vehicle may be configured to perform an operation that corresponds to the operation of the second vehicle. In the exemplary embodiments described below, the operation of the vehicle may be the operation of the communication node located in the vehicle.

Figure 7B:
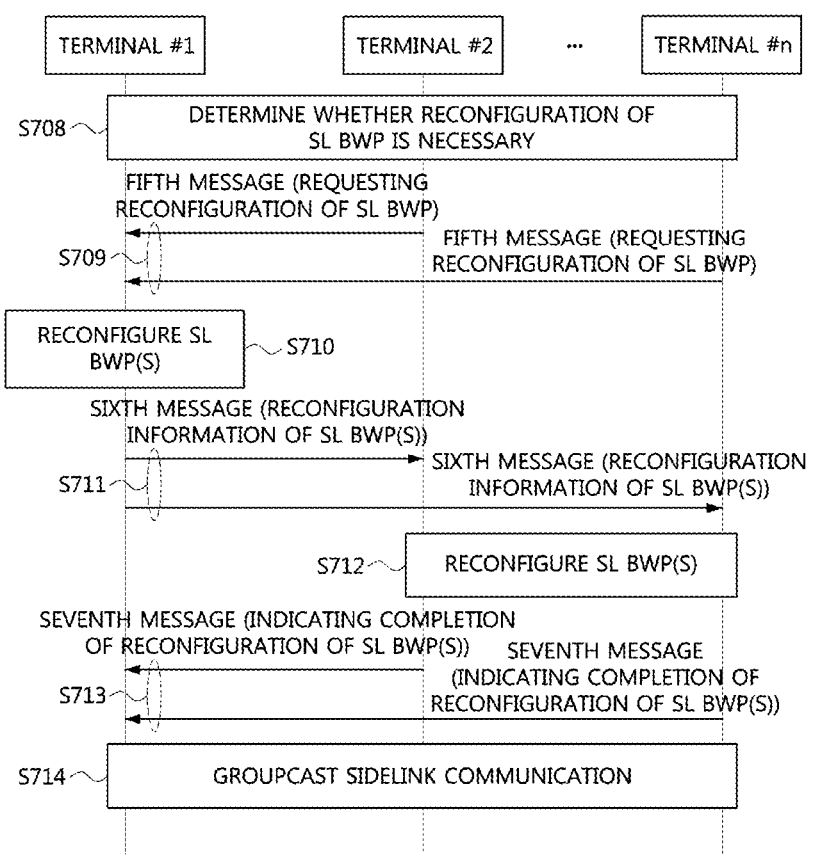
FIG. 7B is a sequence chart illustrating a second exemplary embodiment of a method of reconfiguring a BWP for groupcast in sidelink communication.

FIG. 7A is a sequence chart illustrating a first exemplary embodiment of a method of reconfiguring a BWP for groupcast in sidelink communication, and FIG. 7B is a sequence chart illustrating a second exemplary embodiment of a method of reconfiguring a BWP for groupcast in sidelink communication.

As shown in FIGS. 7A and 7B, a communication system may include a terminal #1, a terminal #2, . . . , a terminal #n, and the like. n may be a natural number equal to or greater than 3. One or more of the terminals may be disposed within cell coverage of a base station. Alternatively, the terminals may not be disposed within cell coverage of a base station. For example, each of the terminals may be the UE 235 or UE 236 shown in FIG. 1. The terminals may be configured identically or similarly to the communication node 300 shown in FIG. 3. The terminals may support the protocol stacks shown in FIGS. 4 to 6.

Sidelink communication may be performed in a groupcast manner. The sidelink communication used in a groupcast manner may be referred to as 'groupcast sidelink communication'. A plurality of terminals (e.g., terminal #1, terminal #2, . . . , terminal #n) may participate in the groupcast sidelink communication. The terminal #1 may refer to a terminal for initiating the groupcast sidelink communication or a terminal for configuring sidelink (SL) BWP(s) for the groupcast sidelink communication.

In the sidelink communication, the terminal #1 may be configured to transmit data in a groupcast manner. Among the terminals participating in the groupcast sidelink communication, the remaining terminals except the terminal #1 (e.g., terminal #2, . . . , terminal #n) may be referred to as 'participating terminals'. The participating terminals may be configured to receive data transmitted in a groupcast manner from the terminal #1. A PC5 interface (e.g., PC5-U interface, PC5-C interface) may be configured between the terminal #1 and the participating terminals.

A default SL BWP used for initial communication (e.g., initial transmission) in the groupcast sidelink communication may be preconfigured. The default SL BWP may be used for a configuration procedure (e.g., initial configuration procedure) of the groupcast sidelink communication. Terminal(s) disposed outside cell coverage of a base station may be configured to perform the groupcast sidelink communication using the default SL BWP. In addition, the default SL BWP may be used for transmitting and receiving a small amount of data in the groupcast sidelink communication. The default SL BWP may be used for a procedure for releasing the groupcast sidelink communication, a procedure for reconfiguring the SL BWP(s), a procedure for releasing the SL BWP(s), and the like. The default SL BWP may be configured as follows.

Default SL BWP Configuration Method #1

The default SL BWP may be predefined in the 3GPP technical specification, and terminals participating in the groupcast sidelink communication may use the default SL BWP defined in the 3GPP technical specification. For example, an index, position information, and size information of the default SL BWP may be defined in the 3GPP technical specification. The index of the default SL BWP may be 0. In particular, the SL BWP #0 may refer to the default SL BWP. The position information of the default SL BWP may indicate a starting physical resource block (PRB) of the default SL BWP. The starting PRB of the default SL BWP may be indicated by an offset (e.g., frequency offset) from a preconfigured point (e.g., 'point A' for a common resource block (CRB)). The starting PRB of the default SL BWP may be a PRB having the lowest frequency among PRBs forming the default SL BWP.

The size information of the default SL BWP may indicate a bandwidth (e.g., X MHz) of the default SL BWP or the number of the PRBs forming the default SL BWP. Particularly, X may be about 20. Alternatively, X may be less than about 20. Alternatively, X may be greater than about 20. When the default SL BWP has a substantial bandwidth (e.g., an increased bandwidth), a frequency range searched for in the configuration procedure (e.g., initial configuration procedure) of the groupcast sidelink communication may increase. When the default SL BWP has a minimal bandwidth (e.g., a decreased bandwidth), the frequency range searched for in the configuration procedure (e.g., initial configuration procedure) of the groupcast sidelink communication may decrease. In particular, the configuration procedure of the groupcast sidelink communication may be performed rapidly, and the power consumption of the terminal may be reduced.

Default SL BWP Configuration Method #2

Configuration information of the default SL BWP may be transmitted to the terminals in an access procedure (e.g., attach procedure) between the terminals (e.g., terminal #1, terminal #2, . . . , terminal #n) and the base station. For example, the base station may be configured to transmit system information including the configuration information of the default SL BWP to the terminals. The configuration information of the default SL BWP may include an index, position information, and size information of the default SL BWP. The terminals may be configured to receive the system information from the base station, and obtain the configuration information of the default SL BWP included in the system information.

Default SL BWP Configuration Method #3

Terminals connected to the base station (e.g., terminals operating in an RRC connected state or an RRC inactive state) may be configured to obtain configuration information of the default SL BWP from the base station. For example, the base station may be configured to inform the terminal of the configuration information of the default SL BWP using one or more of an RRC signaling, a MAC signaling, and a physical (PHY) signaling. When the RRC signaling is used, the configuration information of the default SL BWP may be included in an RRC message (e.g., higher layer message). When the MAC signaling is used, the configuration information of the default SL BWP may be included in a MAC control element (CE). When the PHY signaling is used, the configuration information of the default SL BWP may be included in downlink control information (DCI).

Meanwhile, in addition to the default SL BWP, additional SL BWP(s) for the groupcast sidelink communication may be configured. For example, when the groupcast sidelink communication is difficult to be performed using only the default SL BWP or when the number of terminals participating in the groupcast sidelink communication is greater than or equal to a threshold, additional SL BWP(s) for the groupcast sidelink communication may be configured.

To configure the SL BWP(s) for the groupcast sidelink communication, the terminal #1 be configured to transmit a first message requesting information required for the configuration of the SL BWP to the participating terminals (e.g., terminal #2, . . . , terminal #n) (S701). The first message may be referred to as 'information request message'. The first message may be an RRC message, a MAC message, or a PHY message. The first message may be transmitted and received via the default SL BWP (e.g., SL BWP #0).

The participating terminals may be configured to receive the first message from the terminal #1. Each of the participating terminals may be configured to transmit a second message including its capability information to the terminal #1 (S702). The second message may be referred to as 'information response message'. The second message may be an RRC message, a MAC message, or a PHY message. The second message may be transmitted and received via the default SL BWP (e.g., SL BWP #0).

The capability information may include information regarding a frequency (e.g., frequency range, operating frequency band, frequency range 1 (FR1), FR2, etc.), information regarding a fast Fourier transform (FFT) (e.g., FFT size), information regarding a maximum transmission power, quality information (e.g., quality of service (QoS), packet error rate, packet delay budget, etc.) and size of data to be transmitted via sidelink communication, and the like, which are supported by the participating terminal. FR1 may be a frequency band of 6 GHz or less, and FR2 may be a frequency band of 24.25 GHz to 52.6 GHz.

Alternatively, the capability information of the participating terminal may be delivered in an initial configuration procedure (e.g., configuration procedure of the PC5 interface) between the terminals. The participating terminals may be configured to transmit their capability information to the terminal #1 using the PC5 interface configured with the terminal #1. The capability information of the terminal may be included in SL (sidelink) UE information. In addition, the SL UE information may further include service-related information. The terminal #1 may be configured to receive the capability information (e.g., SL UE information including the capability information) from the participating terminals. In particular, the step S701 and step S702 may be omitted.

The terminal #1 may be configured to configure SL BWP(s) for the groupcast sidelink communication based on one or more among the capability information, a channel state, and transmission data characteristics of the participating terminals (S703). The SL BWP(s) may be configured within a frequency range preconfigured by the base station. The base station may be configured to transmit an RRC message, a MAC message, or a PHY message including information indicating the preconfigured frequency range to the terminal #1. Accordingly, the terminal #1 may be configured to configure the SL BWP(s) within the frequency range preconfigured by the base station.

Alternatively, candidate SL BWPs may be preconfigured by the base station. The base station may be configured to transmit an RRC message, a MAC message, or a PHY message including configuration information of the candidate SL BWPs to the terminal #1. Accordingly, the terminal #1 may be configured to select SL BWP(s) to be used for the groupcast sidelink communication among the candidate SL MVPs configured by the base station. Alternatively, the frequency range within which the SL BWP(s) may be configured or the candidate SL BWPs may not be configured by the base station. In particular, the terminal #1 may be configured to configure the SL BWP(s) without the control of the base station.

The channel state may indicate a quality of the frequency band (e.g., reference signal received power (RSRP), reference signal received quality (RSRQ), reference signal strength indicator (RSSI), signal to interference plus noise ratio (SINR)). The terminal may be configured to configure the SL BWP composed of frequency band(s) having good quality (e.g., sufficient quality). Based on the quality of the frequency band(s), the size of the SL BWP in the frequency domain may vary. The transmission data may be data transmitted in a groupcast manner in sidelink communication. The transmission data characteristic may include a size, a data transmission rate, a latency requirement, and the like of the transmission data.

A bandwidth of the SL BWP may be less than or equal to a maximum bandwidth available for sidelink communication. The SL BWP may include one or more resource blocks (RBs) consecutive in the frequency domain. One SL BWP may have one subcarrier spacing. The SL BWP may be classified into an SL transmission (TX) BWP and an SL reception (RX) BWP. Alternatively, the SL BWP may be configured without discrimination between TX and RX. The SL TX BWP may be an SL BWP used for a transmission operation of the terminal #1 (or the participating terminal), and the SL RX BWP may be an SL BWP used for a reception operation of the terminal #1 (or the participating terminal). The maximum number of configurable SL BWPs may be predefined in the technical specification.

The size of the SL TX BWP may be configured to be equal to the size of the SL RX BWP. For example, when the size of transmission data in the terminal #1 is the same as the size of transmission data in the participating terminal (e.g., terminal #2, . . . , terminal #n), the size of the SL TX BWP may be configured to be equal to the size of the SL RX BWP. Alternatively, the size of the SL TX BWP may be configured differently from the size of the SL RX BWP. For example, when the size of transmission data in the terminal #1 is greater than the size of transmission data in the participating terminal (e.g., terminal #2, . . . , terminal #n), the size of the SL TX BWP for the terminal #1 may be greater than the size of the SL RX BWP for the participating terminal. This case may correspond to a case when the terminal #1 transmits data to the participating terminal, and the participating terminal transmits feedback information for the data to the terminal #1. The SL BWPs configured by the terminal #1 may be as follows.

Figure 8:
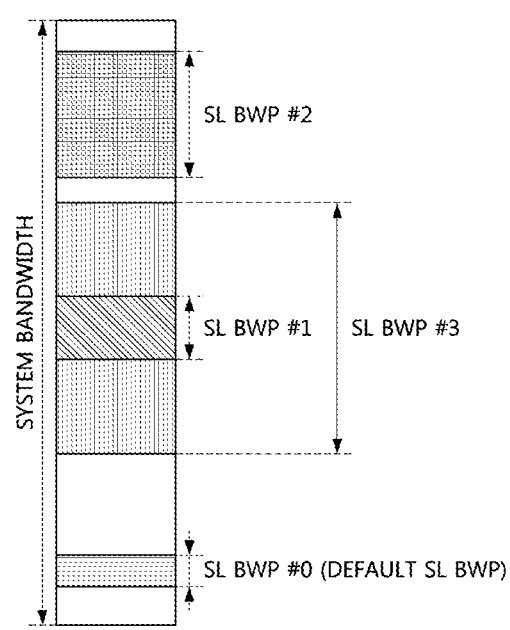
FIG. 8 is a conceptual diagram illustrating an exemplary embodiment of SL BWPs for sidelink communication.

FIG. 8 is a conceptual diagram illustrating an exemplary embodiment of SL BWPs for sidelink communication. As shown in FIG. 8, the terminal may be configured to configure SL BWPs #1 to #3 for groupcast sidelink communication. The SL BWPs #1 to #3 may be configured within a system bandwidth. The SL BWP #0 may be a default SL BWP, and the SL BWP #1 may be an initial SL BWP. The initial SL BWP may be different from the default SL BWP. Alternatively, the default SL BWP may be used as the initial SL BWP. In particular, the initial SL BWP may be the SL BWP #0. The initial SL BWP (e.g., SL BWP #1) may be used for initial communication (e.g., initial transmission) in the groupcast sidelink communication. One or more SL BWPs among the SL BWPs #0 to #3 may be activated in a specific time interval, and the groupcast sidelink communication may be performed using the active SL BWP(s).

The SL BWP #1 may be an SL BWP first activated for the groupcast sidelink communication. The active SL BWP may be switched as needed. For example, the active SL BWP may be switched in consideration of a transmission data size, a transmission data rate, a channel quality, a latency requirement, and/or a service type (e.g., enhanced Mobile BroadBand (eMBB), Ultra-Reliable and Low-Latency Communication (URLLC), massive Machine Type Communication (mMTC), etc.). The switching of the active SL BWP may be performed without control of the base station.

The SL BWPs #1 to #3 may be configured within the same carrier. Alternatively, the SL BWPs #1 to #3 may be configured in different carriers. For example, the SL BWPs #1 and #3 may be configured within a carrier #1, and the SL BWP #2 may be configured within a carrier #2. To support this operation, the base station and the terminals may support a carrier aggregation (CA) function.

Referring back to FIGS. 7A and 7B, the terminal #1 may be configured to generate a third message including configuration information of the SL BWP(s) and transmit the third message to the participating terminals (e.g., terminal #2, . . . , terminal #n) (S704). The third message may be referred to as 'configuration information message'. The third message may be an RRC message, a MAC message, or a PHY message. The third message may be transmitted and received via the default SL BWP (e.g., SL BWP #0). The configuration information of the SL BWP(s) may include an SL BWP list and information indicating an initial SL BWP. When the SL BWPs #1 to #3 are configured, the SL BWP list may be configured as shown in Table 3 below.

In Table 3, s1 to s3 may indicate different starting RBs or the same starting RB. e1 to e3 may indicate different ending RBs or the same ending RB. Additionally, o1 to o3 may indicate different RB offsets or the same RB offset and n1 to n3 may indicate different numbers of RBs or the same number of RBs. Further, t1 to t3 may indicate different activation time points or the same activation time point, d1 to d3 may indicate different activation durations or the same activation duration, and st1 to st3 may indicate different service types or the same service type.

may be a reception time point of the third message. The activation duration may indicate a time interval for which the SL BWP is activated. The activation duration may start from the activation time point.

The information indicating the initial SL BWP may be an SL BWP index. When the SL BWP #1 is defined to be used as the initial SL BWP, the initial SL BWP may be identified based on the information included in the SL BWP list (e.g., SL BWP index). Therefore, the third message including the SL BWP list may not further include information indicating the initial SL BWP. In other words, the participating terminals may be configured to determine the SL BWP #1 as the initial SL BWP in the SL BWP list.

The participating terminals may be configured to receive the third message from the terminal #1, and identify the configuration information of the SL BWP included in the third message (e.g., SL BWP list, information indicating the initial SL BWP). The participating terminals may be configured to configure the SL BWP(s) based on the configuration information of the SL BWP included in the third message (S705). When the configuration of the SL BWP(s) is completed, each of the participating terminals may be configured to transmit to the base station a fourth message indicating that the configuration of the SL BWP(s) has been completed (S706).

In particular, the fourth message may be referred to as 'configuration complete message'. The fourth message may be an RRC message, a MAC message, or a PHY message. The fourth message may be transmitted and received via the default SL BWP (e.g., SL BWP #0). When the fourth message is received from the participating terminals, the terminal #1 may be configured to determine that the configuration of the SL BWP(s) has been completed in the terminals. In this case, the step S706 may be omitted. The terminals (e.g., terminal #1, terminal #2, . . . , terminal #n) may be configured to perform groupcast sidelink commu-

TABLE 3

| SL BWP index | bandwidth | SCS (kHz) | Starting RB index | Ending RB index | RB offset | Number of RBs | Activation time point | Activation duration | Service type |
| --- | --- | --- | --- | --- | --- | --- | --- | --- | --- |
| #1 | 40 MHz | 15 | s1 | e1 | o1 | n1 | t1 | d1 | st1 |
| #2 | 80 MHz | 30 | s2 | e2 | o2 | n2 | t2 | d2 | st2 |
| #3 | 160 MHz | 15 | s3 | e3 | o3 | n3 | t3 | d3 | st3 |

The SL BWP list may include one or more pieces of information among a bandwidth, a subcarrier spacing, a starting RB index, an ending RB index, an RB offset, number of RBs, an activation time point, an activation duration, and a service type (e.g., eMBB, URLLC, mMTC). The starting RB index may indicate an RB having the lowest frequency among RBs forming the SL BWP. The ending RB index may indicate an RB having the highest frequency among the RBs forming the SL BWP. The RB offset may be an offset from a reference RB to the starting RB or ending RB of the SL BWP. The number of RBs may indicate the number of the RBs forming the SL BWP.

The activation time point may indicate a time point when the SL BWP is activated. In addition, the activation time point may refer to a switching time point between active SL BWPs. The activation time point may be indicated by a subframe index, slot index, and/or symbol index. Alternatively, the activation time point may be an offset from a reference time point. For example, the reference time point nication using the SL BWP(s) (S707). The groupcast sidelink communication may be performed using the initial SL BWP (e.g., SL BWP #1).

Meanwhile, switching of the active SL BWP or addition of a new active SL BWP may be required according to the channel quality, the transmission data size, the data transmission rate, the delay requirement, the service type, etc. between the terminal #1 and the participating terminals. In response to determining that the switching of the active SL BWP or the addition of a new active SL BWP is required, the terminal #1 may be configured to select another SL BWP(s) other than the currently active SL BWP from the SL BWP list. The terminal #1 may be configured to transmit a message including information (e.g., SL BWP index) indicating the selected SL BWP(s) to the participating terminals (e.g., terminal #2, . . . , terminal #n). Particularly, the message may be sidelink control information (SCI). The message may further include information indicating an activation time point of the selected SL BWP(s) as well as the information indicating the selected SL BWP(s).

The participating terminals may be configured to obtain the information indicating the SL BWP other than the currently active SL BWP and/or the information indicating the activation time point based on the message received from the terminal #1. The participating terminals may then be configured to switch the active SL BWP to the SL BWP selected by the terminal #1 and perform the groupcast sidelink communication in the switched SL BWP. Alternatively, the participating terminals may be configured to configure the SL BWP(s) selected by the terminal #1 as new active SL BWP(s), and perform the groupcast sidelink communication using the plurality of active SL BWPs. The switching operation of the SL BWP for the groupcast sidelink communication may be performed as follows.

Figure 9:
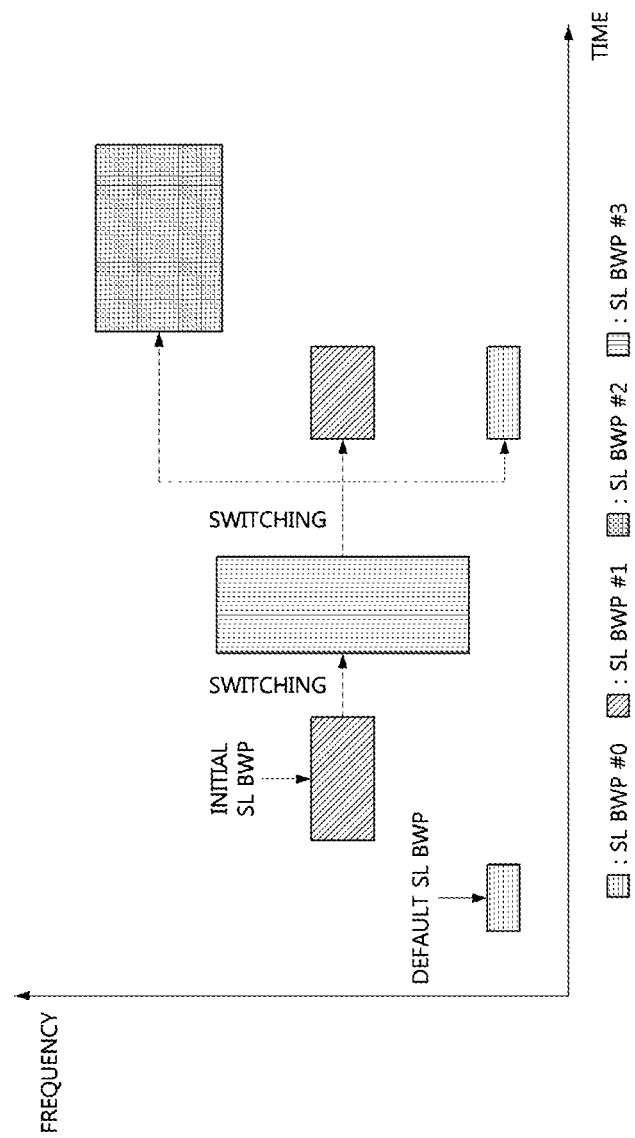
FIG. 9 is a sequence chart illustrating an exemplary embodiment of a method for switching an SL BWP for groupcast sidelink communication.

FIG. 9 is a sequence chart illustrating an exemplary embodiment of a method for switching an SL BWP for groupcast sidelink communication. As shown in FIG. 9, the SL BWP #0 may be configured as the default SL for the groupcast sidelink communication between terminals (e.g., terminal #1, terminal #2, . . . , terminal #n shown in FIGS. 7A and 7B).

When the configuration of the SL BWP(s) for the groupcast sidelink communication is completed, the terminals may be configured to first perform the groupcast sidelink communication using the initial SL BWP (e.g., SL BWP #1). During the groupcast sidelink communication using the initial SL BWP, the switching of the SL BWP may be determined to be required. For example, the terminal #1 may be configured to determine that the switching of the SL BWP is necessary. Alternatively, the participating terminals (e.g., terminal #2 (e.g., second terminal), . . . , terminal #n) may be configured to determine that the switching of the SL BWP is necessary, and transmit a message requesting the switching of the SL BWP to the terminal #1 (e.g., first terminal).

The terminal #1 may be configured to select a new SL BWP from the SL BWP list configured in the step S703, and transmit information (e.g., SCI) including an index of the new SL BWP to the participating terminals. The new SL BWP may be an SL BWP SL BWP #2 or #3) other than the initial SL BWP (e.g., SL BWP #1). The terminals may be configured to perform the groupcast sidelink communication using the new SL BWP.

For example, a switch may be determined from the initial SL BWP (e.g., SL BWP #1) to the SL BWP #3, and the terminals may be configured to perform the groupcast sidelink communication using the SL BWP #3. When the groupcast sidelink communication is completed in the SL BWP #3 or when a time according to a timer after the switching of the SL BWP expires or elapses, the active SL BWP of the terminals may be switched from the SL BWP #3 to the default SL BWP or initial SL BWP. Alternatively, when the new SL BWP is determined as the SL BWP #2 in the terminals, the active SL BWP of the terminals may be switched from the SL BWP #3 to the SL BWP #2. In particular, the terminals may be configured to perform the sidelink communication using the SL BWP #2.

Referring back to FIGS. 7A and 7B, when the switching of the active SL BWP or the addition of a new active SL BWP is required according to the channel quality, the transmission data size, the data transmission rate, the delay requirement, the service type, etc., an SL BWP required by the terminals may not exist in the SL BWP list configured by the terminal #1. In particular, the terminals may be configured to determine that the SL BWP (e.g., SL BWP list) requires reconfiguration. In addition, when the terminals participating in the groupcast sidelink communication are changed, the terminal #1 may be configured to determine that the SL BWP (e.g., SL BWP list) requires reconfiguration. For example, when a new terminal participates in the groupcast sidelink communication or when an existing participating terminal leaves, the terminal #1 may be configured to determine that the SL BWP (e.g., SL BWP list) requires reconfiguration.

The terminals may be configured to periodically determine whether the SL BWP (e.g., SL BWP list) requires reconfiguration (S708). Alternatively, when a specific event occurs, the terminals may be configured to determine whether the SL BWP (e.g., SL BWP list) requires reconfiguration (S708). For example, when an SL BWP that supports a data transmission rate required by the terminal, an SL BWP that meets a delay requirement required by the terminal, or an SL BWP that supports a service required by the terminal does not exist in the SL BWP list, or when the terminals participating in the groupcast sidelink communication are changed, the terminals may be configured to determine that the SL BWP SL BWP list) requires reconfiguration.

In response to determining by the participating terminal(s) that the SL BWP (e.g., SL BWP list) require reconfiguration, the participating terminal(s) may be configured to transmit a fifth message requesting reconfiguration of the SL BWP (e.g., SL BWP list) to the terminal #1 (S709). The fifth message may be referred to as 'reconfiguration request message'. The fifth message may be an RRC message, a MAC message, or a PHY message. The fifth message may be transmitted and received via the currently active SL BWP, the initial SL BWP, or the default SL BWP.

The fifth message may include characteristic information of the SL BWP required by the participating terminal(s). The characteristic information of the SL BWP may include one or more among a bandwidth, a subcarrier spacing, a starting RB index, an ending RB index, an RB offset, number of RBs, an activation time point, an activation duration, a service type, a channel quality, a transmission data size, a data transmission rate, and a delay requirement. In addition, the fifth message may include a reason for the reconfiguration request for the SL BWP (e.g., SL BWP list). The reason for the reconfiguration request for the SL BWP (e.g., SL BWP list) may be a change in the transmission data rate, the delay requirement, the service type, or the like.

The terminal #1 may be configured to receive the fifth message from the participating terminal(s). When the fifth message is received, the terminal #1 may be configured to determine that the reconfiguration of the SL BWP (e.g., SL BWP list) is requested. The terminal #1 may then be configured to determine whether the reconfiguration of the SL BWP (e.g., SL BWP list) is allowed based on the information included in the fifth message. When the reconfiguration of the SL BWP (e.g., SL BWP list) is not allowed, the terminal #1 may be configured to transmit a message indicating that the reconfiguration of the SL BWP (e.g., SL BWP list) is not allowed to the participating terminal(s).

In response to receiving the message indicating that the reconfiguration of the SL BWP (e.g., SL BWP list) is not allowed, the participating terminal(s) may be configured to continue to perform the groupcast sidelink communication using the SL BWP(s) belonging to the existing SL BWP list (i.e., the SL BWP list configured in the step S703). Alternatively, in response to receiving the message indicating that the reconfiguration of the SL BWP (e.g., SL BWP list) is not allowed, the participating terminal(s) may be configured to terminate the groupcast sidelink communication.

When the reconfiguration of the SL BWP (e.g., SL BWP list) is allowed, the terminal #1 may be configured to reconfigure the SL BWP(s) based on the characteristic information of the SL BWP required by the participating terminal(s) and/or the reason for the reconfiguration request for the SL BWP which are included in the fifth message (e.g., SL BWP list) (S710). For example, the terminal #1 may be configured to reconfigure the SL BWP(s) meeting the characteristic information of the SL BWP required by the participating terminal(s). Alternatively, instead of the participating terminal(s), the terminal #1 may be configured to determine that the SL BWP (e.g., SL BWP list) requires reconfiguration. In particular, the step S709 may be omitted and the terminal #1 may be configured to reconfigure the SL BWP(s) for the groupcast sidelink communication according to the step S710.

Further, the terminal #1 may be configured to generate a sixth message including reconfiguration information of the SL BWP(s), and transmit the sixth message to the participating terminals (S711). The sixth message may be referred to as 'reconfiguration information message'. The sixth message may be an RRC message, a MAC message, or a PHY message. The sixth message may be transmitted and received via the currently active SL BWP, the initial SL BWP, or the default SL BWP. The reconfiguration information of the SL BWP(s) may include an SL BWP list and information indicating an initial SL BWP. The SL BWP list included in the reconfiguration information of the SL BWP(s) may be configured similarly to Table 3. For example, the SL BWP list may further include new SL BWPs (e.g., SL BWPs #4 to #6) compared to the existing SL BWP listed in Table 3. Alternatively, the SL BWP list may include SL BWPs (e.g., SL BWPs #4 to #6) different from the existing SL BWPs described in Table 3.

The participating terminals may be configured to receive the sixth message from the terminal #1, and identify the reconfiguration information of the SL BWP included in the sixth message (e.g., the SL BWP list and the information indicating the initial SL BWP). The participating terminals may be configured to reconfigure the SL BWP(s) based on the reconfiguration information of the SL BWP included in the sixth message (S712). When the reconfiguration of the SL BWP(s) is completed, each of the participating terminals may be configured to transmit to the base station a seventh message indicating that the reconfiguration of the SL BWP(s) has been completed (S713). The seventh message may be referred to as 'reconfiguration complete message'. The seventh message may be an RRC message, a MAC message, or a PHY message. The seventh message may be transmitted and received via the currently active SL BWP, the initial SL BWP, or the default SL BWP. In response to receiving the seventh message from the participating terminals, the terminal #1 may be configured to determine that the reconfiguration of the SL BWP(s) has been completed in the participating terminals. Particularly, the step S713 may be omitted.

The terminals may be configured to perform groupcast sidelink communication using the SL BWP(s) reconfigured by the terminal #1 (S714). The terminals may be configured to determine whether the SL BWP require reconfiguration by performing the step S708 during the groupcast sidelink communication. When the reconfiguration of the SL BWP is required, the reconfiguration procedure of the SL BWP (e.g., the steps S709 to S713) may be performed. When the reconfiguration of the SL BWP is not necessary, the groupcast sidelink communication may be performed without performing the reconfiguration procedure of the SL BWP.

The exemplary embodiments of the present disclosure may be implemented as program instructions executable by a variety of computers and recorded on a non-transitory computer readable medium. The non-transitory computer readable medium may include a program instruction, a data file, a data structure, or a combination thereof The program instructions recorded on the non-transitory computer readable medium may be designed and configured specifically for the present disclosure or can be publicly known and available to those who are skilled in the field of computer software.

Examples of the non-transitory computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the exemplary embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. A method of a first user equipment (UE), the method comprising:
   receiving, from a base station, a sidelink (SL) bandwidth part (BWP) information for configuring at least one SL BWP;
   identifying a first SL BWP among the at least one SL BWP configured by the SL BWP information;
   transmitting, to a second UE, a first message for requesting capability information of the second UE;
   receiving, from the second UE, a second message including the capability information of the second UE; and
   performing communication with the second UE in the first SL BWP,
   wherein the capability information includes information on a frequency band supported by the second UE.

2. The method of claim 1, wherein the SL BWP information includes at least one of an index, an activation time point, or an activation duration of the first SL BWP.

3. The method of claim 1, wherein the SL BWP information is included in a radio resource control (RRC) message, a medium access control (MAC) message, or a physical (PHY) message.

4. The method of claim 1, further comprising:
   switching an active SL BWP from the first SL BWP to a second SL BWP among the at least one SL BWP; and
   performing communication with the second UE in the second SL BWP.

5. The method of claim 4, wherein the active SL BWP is switched considering at least one of a transmission data size, a transmission data rate, a channel quality, a latency requirement, or a service type.

6. The method of claim 1, wherein the SL BWP information includes at least one of an index, position information, or size information of each of the at least one SL BWP.

7. The method of claim 1, wherein the at least one SL BWP includes two more SL BWPs among a default SL BWP, a groupcast SL BWP, and a candidate SL BWP.

8. The method of claim 1, wherein the SL BWP information is included in a system information block (SIB) message.

9. A first user equipment (UE), the first UE comprising:
at least one processor,
wherein the at least one processor causes the first UE to:
receive, from a base station, a sidelink (SL) bandwidth part (BWP) information for configuring at least one SL BWP;
identify a first SL BWP among the at least one SL BWP configured by the SL BWP information;
transmitting, to a second UE, a first message for requesting capability information of the second UE;
receiving, from the second UE, a second message including the capability information of the second UE; and
perform communication with the second UE in the first SL BWP,
wherein the capability information includes information on a frequency band supported by the second UE.

10. The first UE of claim 9, wherein the SL BWP information includes at least one of an index, an activation time point, or an activation duration of the first SL BWP.

11. The first UE of claim 9, wherein the SL BWP information is included in a radio resource control (RRC) message, a medium access control (MAC) message, or a physical (PHY) message.

12. The first UE of claim 9, wherein the at least processor further causes the first UE to:
switch an active SL BWP from the first SL BWP to a second SL BWP among the at least one SL BWP; and
perform communication with the second UE in the second SL BWP.

13. The first UE of claim 12, wherein the active SL BWP is switched considering at least one of a transmission data size, a transmission data rate, a channel quality, a latency requirement, or a service type.

14. The first UE of claim 9, wherein the SL BWP information includes at least one of an index, position information, or size information of each of the at least one SL BWP.

15. The first UE of claim 9, wherein the at least one SL BWP includes two more SL BWPs among a default SL BWP, a groupcast SL BWP, and a candidate SL BWP.

16. The first UE of claim 9, wherein the SL BWP information is included in a system information block (SIB) message.

* * * * *